US011180045B2

(12) United States Patent
Tsukamoto (10) Patent No.: US 11,180,045 B2
(45) Date of Patent: Nov. 23, 2021

(54) CHARGING APPARATUS (71) Applicant: TOYOTA JIDOSHA KABUSHIKI KAISHA, Toyota (JP)

(72) Inventor: Shota Tsukamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 16/554,933

(22) Filed: Aug. 29, 2019

(65) Prior Publication Data
US 2020/0108729 A1 Apr. 9, 2020

(30) Foreign Application Priority Data

Oct. 4, 2018 (JP) .............................. JP2018-189500

(51) Int. Cl.
*B60L 53/62* (2019.01)
*H02J 7/00* (2006.01)
*B60L 53/14* (2019.01)
*B60K 6/28* (2007.10)

(52) U.S. Cl.
CPC .............. *B60L 53/62* (2019.02); *B60L 53/14* (2019.02); *H02J 7/007* (2013.01); *H02J 7/0045* (2013.01); *B60K 6/28* (2013.01); *B60Y 2200/91* (2013.01); *B60Y 2200/92* (2013.01); *B60Y 2300/91* (2013.01)

(58) Field of Classification Search
CPC .......... B60L 53/62; B60L 53/14; B60L 53/16; B60L 53/302; B60L 58/26; B60L 58/10; B60L 2240/545; B60L 2240/549; H02J 7/0045; H02J 7/007; B60Y 2300/91; B60Y 2200/91; B60Y 2200/92; B60Y 2306/05; B60K 6/28; Y02T 90/12; Y02T 90/14; Y02T 10/7072; Y02T 10/70; Y02T 90/40; H01R 2201/26; H01R 13/005
See application file for complete search history.

(56) References Cited

U.S. PATENT DOCUMENTS

| 6,281,663 | B1 | 8/2001 | Yagi et al. |
| 10,717,367 | B1* | 7/2020 | Price ..................... B60L 53/302 |
| 10,836,267 | B2* | 11/2020 | Kim .................. H05K 7/20272 |
| 2012/0193068 | A1* | 8/2012 | Nemesh .............. H01M 10/625 165/41 |
| 2016/0221458 | A1* | 8/2016 | Lopez ..................... B60L 53/14 |
| 2017/0361722 | A1* | 12/2017 | Kohler ................... B60L 53/31 |

(Continued)

FOREIGN PATENT DOCUMENTS

| JP | 10-223263 A | 8/1998 |
| JP | 2004-171796 A | 6/2004 |
| JP | 2010-233360 A | 10/2010 |

*Primary Examiner* — Nha T Nguyen
(74) *Attorney, Agent, or Firm* — Sughrue Mion, PLLC (57) ABSTRACT

A charging apparatus is configured to charge a battery mounted in a vehicle when a charging connector is connected to a charging inlet of the vehicle. The charging apparatus includes an electronic control unit. The electronic control unit is configured to determine whether a cooling mechanism for the charging inlet is provided in the vehicle. In a case where the cooling mechanism for the charging inlet is provided, the electronic control unit sets a charge current for the battery to a value larger than a value to which the charge current for the battery is set in a case where the cooling mechanism for the charging inlet is not provided.

4 Claims, 5 Drawing Sheets

(56) References Cited

U.S. PATENT DOCUMENTS

| | | | |
|---|---|---|---|
| 2018/0236884 A1 | 8/2018 | Grienitz et al. | |
| 2018/0236892 A1* | 8/2018 | Lee | B60L 50/60 |
| 2019/0217728 A1* | 7/2019 | Reber | B60L 53/16 |
| 2019/0291588 A1* | 9/2019 | Chou | B60L 11/1818 |
| 2019/0308519 A1* | 10/2019 | Tsukamoto | B60L 53/16 |
| 2019/0341661 A1* | 11/2019 | Guerra | B60L 53/37 |
| 2020/0063700 A1* | 2/2020 | Schwarz | F02B 29/045 |
| 2020/0269713 A1* | 8/2020 | Hakenberg | H01R 13/4538 |
| 2020/0290468 A1* | 9/2020 | Moseke | B60L 53/16 |

* cited by examiner

CHARGING APPARATUS

INCORPORATION BY REFERENCE

The disclosure of Japanese Patent Application No. 2018-189500 filed on Oct. 4, 2018 including the specification, drawings and abstract is incorporated herein by reference in its entirety.

BACKGROUND

1. Technical Field

The disclosure relates to a charging system configured to charge a battery mounted in a vehicle when a charging connector is connected to a charging inlet of the vehicle.

2. Description of Related Art

Japanese Unexamined Patent Application Publication No. 10-223263 (JP 10-223263 A) discloses a charging method in which a cooling medium is supplied to a secondary battery from a cooling medium source provided on outside, so as to control a temperature of the secondary battery when the secondary battery is coupled to and charged by a power supply provided on the outside.

SUMMARY

In a charging process in which a charging connector is connected to a charging inlet of the vehicle so as to charge the battery mounted in the vehicle, heat is generated in a contact portion between a charging system and the vehicle during charging under mutual influences of the charging system and the vehicle. Accordingly, in the case where a sufficient cooling mechanism is provided in the vehicle, the charging system does not need to operate the cooling mechanism or restrict a charge current. However, in the related art, the charging system cannot determine whether the cooling mechanism is provided in the vehicle. Thus, there is a possibility that the battery mounted in the vehicle cannot be charged efficiently.

The disclosure provides a charging apparatus capable of efficiently charging a battery mounted in a vehicle.

An aspect of the disclosure relates to a charging apparatus configured to charge a battery mounted in a vehicle when a charging connector is connected to a charging inlet of the vehicle. The charging apparatus includes an electronic control unit configured to determine whether a cooling mechanism for the charging inlet is provided in the vehicle, wherein in a case where the cooling mechanism for the charging inlet is provided, the electronic control unit sets a charge current for the battery to a value larger than a value to which the charge current for the battery is set in a case where the cooling mechanism for the charging inlet is not provided.

In the charging apparatus according to the above aspect, the electronic control unit may be configured to determine whether an increase amount per unit time of a temperature of the charging inlet is smaller than a first specified value during execution of a charging process; set the charge current for the battery to an upper limit current in a case where the increase amount per unit time of the temperature of the charging inlet is smaller than the first specified value; and restrict the charge current for the battery to a second specified value that is smaller than the upper limit current in a case where the increase amount per unit time of the temperature of the charging inlet is equal to or larger than the first specified value. Thus, the battery can be charged efficiently in consideration of an operating state of the cooling mechanism for the charging inlet.

In the charging apparatus according to the above aspect, the electronic control unit may be configured to set the charge current for the battery based on whether the cooling mechanism for the charging inlet is provided, before charging of the battery is initiated. Thus, the battery, which is mounted in the vehicle, can be charged efficiently.

In the charging apparatus according to the above aspect, the electronic control unit may be configured to set the charge current for the battery based on the increase amount per unit time of the temperature of the charging inlet, after charging of the battery is initiated.

With the charging apparatus according to the above aspect, the charge current for the battery, which is mounted in the vehicle, is controlled in accordance with whether the cooling mechanism for the charging inlet is provided in the vehicle. Thus, the battery, which is mounted in the vehicle, can be charged efficiently.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on a configuration and operation of a charging system according to an embodiment of the disclosure with reference to the drawings. That is, a description will hereinafter be made on a configuration and operation of a charging system according to an embodiment in which a charging apparatus according to the disclosure is applied.

Figure 1:
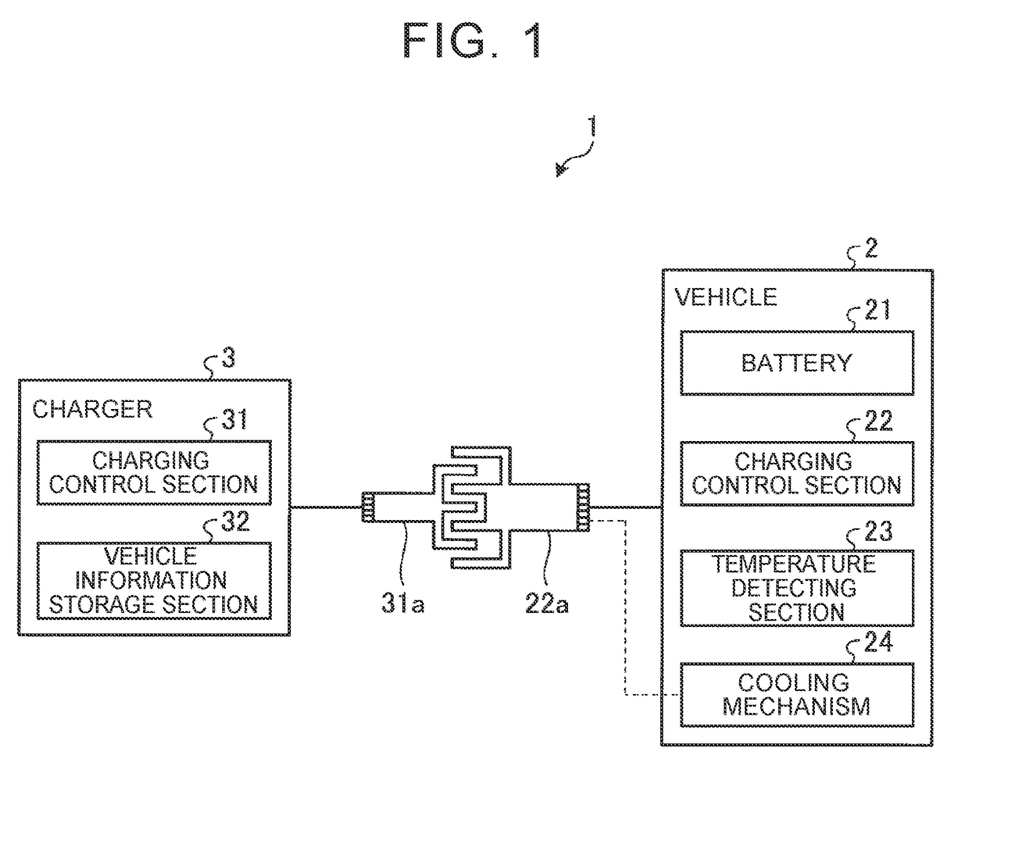
FIG. 1 is a block diagram illustrating a configuration of a charging system according to an embodiment of the disclosure.
Figure 2:
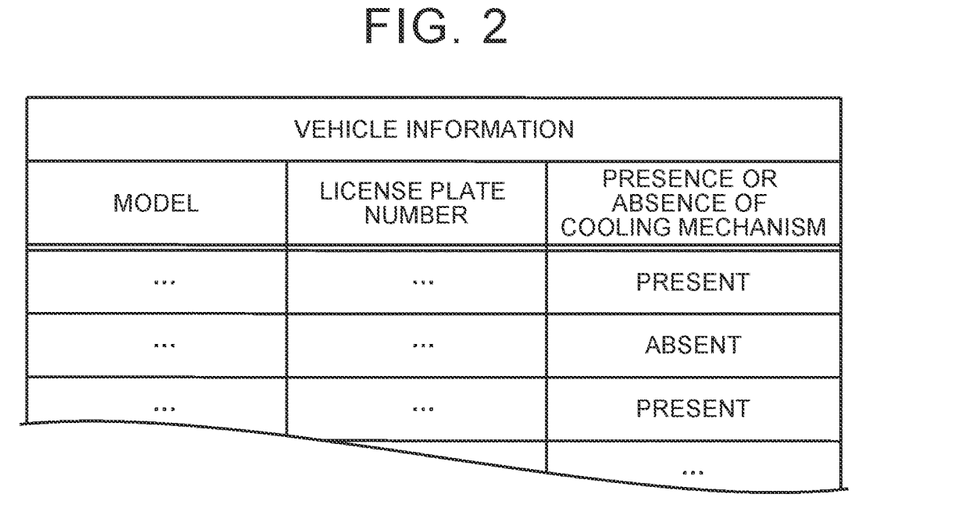
FIG. 2 is a table showing an example of vehicle information.

A description will first be made on the configuration of the charging system according to the embodiment of the disclosure with reference to FIG. 1 and FIG. 2. FIG. 1 is a block diagram illustrating the configuration of the charging system according to the embodiment of the disclosure. FIG. 2 is a table illustrating an example of vehicle information.

As illustrated in FIG. 1, a charging system 1 according to an embodiment of the disclosure is a system configured to charge a battery 21, which is mounted in a vehicle 2 such as an electric vehicle (EV), a plug-in hybrid vehicle (PHV), or a fuel cell electric vehicle (FCEV), when a charging connector 31*a* of a charger 3 installed on the outside of the vehicle 2 is connected to a charging inlet (a charger receiving port) 22a of the vehicle 2.

In this charging system 1, the battery 21, a charging control section 22, a temperature detecting section 23, and a cooling mechanism 24 are provided in the vehicle 2. Note that there is a case where the temperature detecting section 23 and the cooling mechanism 24 are not provided depending on a model of the vehicle 2.

The battery 21 is constructed of a nickel-metal hydride battery or a lithium-ion battery, for example, and stores high-voltage DC power used to drive the vehicle 2.

The charging control section 22 is constructed of an electronic circuit that includes a well-known microcomputer as a main body, and the well-known microcomputer includes a central processing unit (CPU), random access memory (RAM), read only memory (ROM), an input/output interface, and the like. In other words, the charging control section 22 is an electronic control unit. The charging control section 22 cooperates with a charging control section 31 that is provided in the charger 3, so as to control a charging process of charging the battery 21 using the charger 3.

The temperature detecting section 23 is constructed of a temperature sensor mounted in the charging inlet 22a. The temperature detecting section 23 detects an increase amount dT/dt per unit time of a temperature T of the charging inlet 22a, and outputs an electric signal, which indicates the detected increase amount dT/dt per unit time of the temperature T of the charging inlet 22a, to the charging control section 22.

The cooling mechanism 24 is a cooling mechanism that cools the charging inlet 22a and can be controlled by the charging control section 22. Examples of the cooling mechanism 24 are an air-cooled heat sink and a water-cooled heat exchanger.

In the charger 3, the charging control section 31 and a vehicle information storage section 32 are provided.

The charging control section 31 is constructed of an electronic circuit that includes a microcomputer similar to that in the charging control section 22 as a main body. In other words, the charging control section 31 is an electronic control unit. The charging control section 31 cooperates with the charging control section 22, so as to control the charging process of charging the battery 21 via the charging connector 31a and the charging inlet 22a.

The vehicle information storage section 32 stores information (the vehicle information) on the vehicles 2 whose batteries 21 have been charged by the charger 3 in the past, and representative models. Specifically, as illustrated in FIG. 2, the vehicle information storage section 32 stores, as the vehicle information, the models, license plate numbers, and presence or absence of the cooling mechanism 24 of the vehicles 2 whose batteries 21 have been charged by the charger 3 in the past, in association with each other.

In the charging system 1 with such a configuration, the battery 21 is efficiently charged when the charging control section 31 in the charger 3 executes a charging control process, which will be described below. A description will hereinafter be made on operation of the charging control section 31 at the time of executing the charging control process with reference to a flowchart illustrated in FIG. 3.

Figure 3:
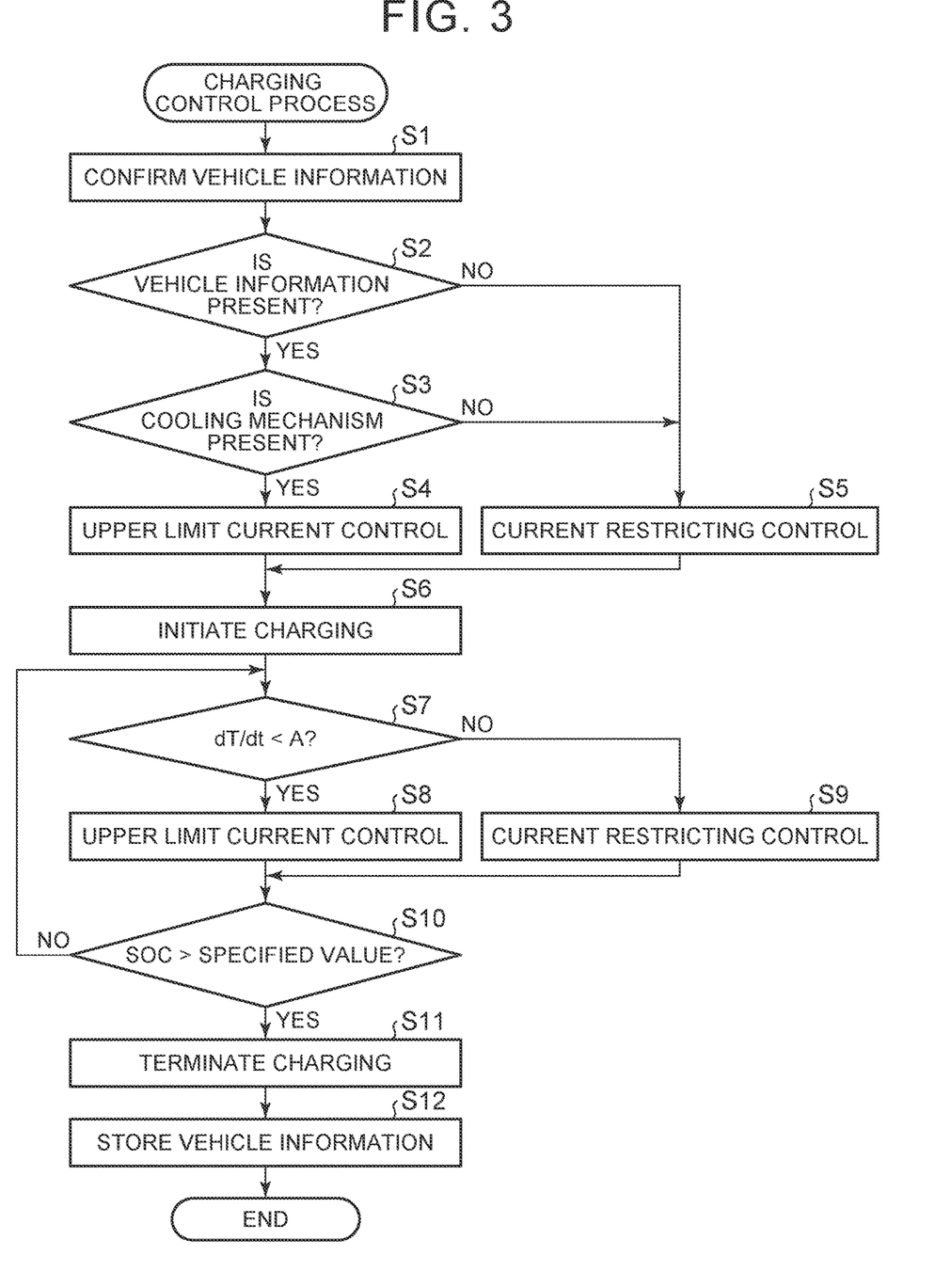
FIG. 3 is a flowchart illustrating a procedure of a charging control process according to the embodiment of the disclosure.

FIG. 3 is a flowchart illustrating a procedure of the charging control process according to the embodiment of the disclosure. The flowchart illustrated in FIG. 3 is initiated at timing at which the charging connector 31a is connected to the charging inlet 22a, and the charging control process proceeds to a process in step S1. Note that the charging control section 31 may initiate the charging control process at timing at which a position information system such as a Global Positioning System (GPS) detects that the vehicle 2 enters a specified range around an installed position of the charger 3 or timing at which a user shows intention of using the charger 3 by making a reservation for use of the charger 3, or the like.

In the process of step S1, the charging control section 31 confirms presence or absence of the vehicle information on the vehicle 2, to which the charging connector 31a is connected. Specifically, the charging control section 31 acquires the information on the model of the vehicle 2 by communicating with the charging control section 22 in the vehicle 2. Alternatively, the charging control section 31 acquires the information on the model and the license plate number of the vehicle 2 by recognizing a body shape of the vehicle 2 using an image recognition technique so as to specify the model of the vehicle 2 or by recognizing the license plate number of the vehicle 2 using the image recognition technique. Then, the charging control section 31 determines whether the vehicle information corresponding to the acquired information is stored in the vehicle information storage section 32, so as to confirm the presence or the absence of the vehicle information on the vehicle 2. In this way, the process of step S1 is completed, and the charging control process proceeds to a process of step S2.

In the process of step S2, the charging control section 31 determines whether the vehicle information is confirmed in the process of step S1. As a result of the determination, if the vehicle information is confirmed (step S2: YES), the charging control process proceeds to a process of step S3. On the other hand, if the vehicle information is not confirmed (step S2: NO), the charging control process proceeds to a process of step S5.

In the process of step S3, the charging control section 31 determines whether the vehicle 2 includes the cooling mechanism 24 on the basis of the vehicle information stored in the vehicle information storage section 32. As a result of the determination, if the vehicle 2 includes the cooling mechanism 24 (step S3: YES), the charging control process proceeds to a process of step S4. On the other hand, if the vehicle 2 does not include the cooling mechanism 24 or presence or absence of the cooling mechanism 24 cannot be determined on the basis of the vehicle information (step S3: NO), the charging control process proceeds to a process of step S5.

Figure 4:
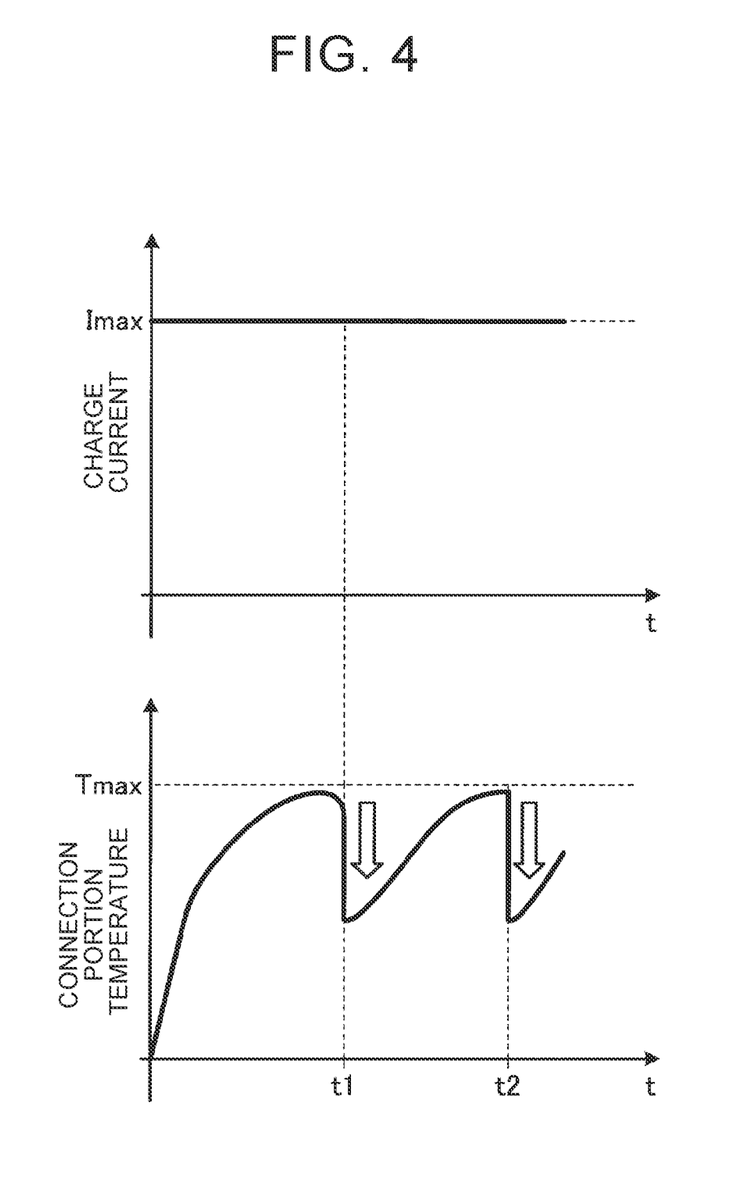
FIG. 4 includes graphs illustrating upper limit current control.

In the process of step S4, the charging control section 31 sets a charge current for the battery 21 to an upper limit value (an upper limit current) (upper limit current control). Specifically, as illustrated in an upper graph in FIG. 4, the charging control section 31 controls the charge current for the battery 21 to an upper limit current Imax. With such a configuration, as illustrated in a lower graph in FIG. 4, during charging, a temperature of a connection portion between the charging inlet 22a and the charging connector 31a (a connection portion temperature) reaches an upper limit temperature Tmax (time t=t1, t2). However, every time the connection portion temperature reaches the upper limit temperature Tmax, the cooling mechanism 24 is operated to cool the connection portion. Thus, the battery 21 can be charged efficiently. In this way, the process of step S4 is completed, and the charging control process proceeds to a process of step S6.

Figure 5:
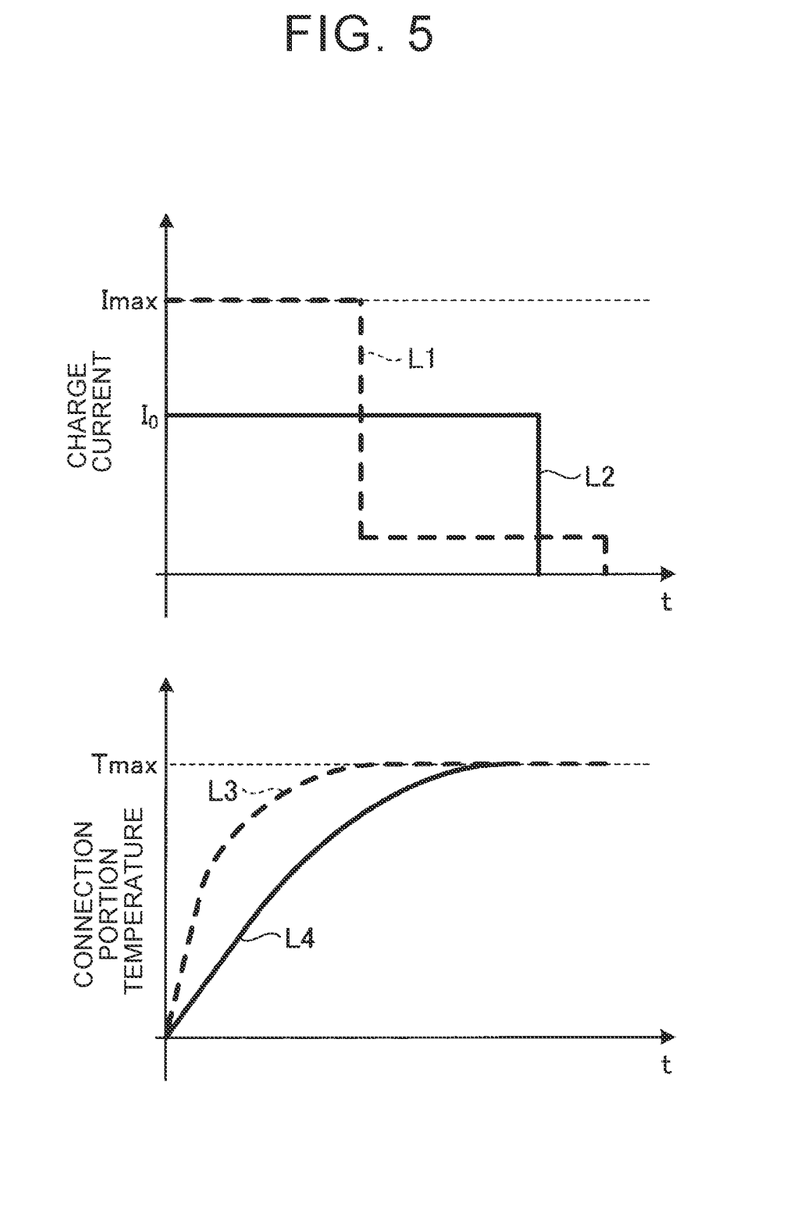
FIG. 5 includes graphs illustrating current restricting control.

In the process of step S5, the charging control section 31 sets the charge current for the battery 21 to a specified value that is smaller than the upper limit current (current restricting control). Specifically, in the case where the charge current for the battery 21 is set to the upper limit current Imax as indicated by a broken line L1 in an upper graph in FIG. 5, the connection portion temperature promptly reaches the upper limit temperature Tmax as indicated by a broken line L3 in a lower graph in FIG. 5. As a result, the charge current needs to be restricted, which extends a charging time. In contrast to this, in the case where the charge current for the battery 21 is controlled to a specified value $I_0$ that is smaller than the upper limit current Imax as indicated by a solid line L2 in the upper graph in FIG. 5, the connection portion temperature can be prevented from reaching the upper limit temperature Tmax until completion of charging of the battery 21 as indicated by a solid line L4 in the lower graph in FIG. 5. Thus, restricting the charge current makes it possible to suppress the extension of the charging time. Note that a magnitude of the specified value $I_0$ may be determined in accordance with a state of charge, the charging time, a heat generation amount, and the like of the battery 21 so that the connection portion temperature does not reach the upper limit temperature Tmax until the completion of charging of the battery 21. In this way, the process of step S5 is completed, and the charging control process proceeds to a process of step S6.

In the process of step S6, the charging control section 31 cooperates with the charging control section 22 to initiate the charging process of the battery 21. In this way, the process of step S6 is completed, and the charging control process proceeds to a process of step S7.

In the process of step S7, based on the electric signal from the temperature detecting section 23, the charging control section 31 determines whether the increase amount dT/dt per unit time of the temperature T of the charging inlet 22a is smaller than a specified value A (a first specified value). As a result of the determination, if the increase amount dT/dt per unit time of the temperature T of the charging inlet 22a is smaller than the specified value A (step S7: YES), the charging control process proceeds to a process of step S8. On the other hand, if the increase amount dT/dt per unit time of the temperature T of the charging inlet 22a is equal to or larger than the specified value A (step S7: NO), the charging control process proceeds to a process of step S9.

In the process of step S8, the charging control section 31 determines that the cooling mechanism 24 is operated normally, and sets the charge current for the battery 21 to the upper limit current Imax (the upper limit current control). In this way, the process of step S8 is completed, and the charging control process proceeds to a process of step S10.

In the process of step S9, the charging control section 31 determines that the cooling mechanism 24 is not operated normally or that the cooling mechanism 24 is not provided in the vehicle 2, and controls the charge current for the battery 21 to a specified value $I_1$ (a second specified value) that is smaller than the upper limit current Imax (the current restricting control). In this way, the process of step S9 is completed, and the charging control process proceeds to a process of step S10.

In the process of step S10, the charging control section 31 determines whether the state of charge (SOC) of the battery 21 is larger than a specified value. As a result of the determination, if the SOC of the battery 21 is larger than the specified value (step S10: YES), the charging control process proceeds to a process of step S11. On the other hand, if the SOC of the battery 21 is equal to or smaller than the specified value (step S10: NO), the charging control process returns to the process of step S7.

In the process of step S11, the charging control section 31 terminates the charging process of the battery 21. In this way, the process of step S11 is completed, and the charging control process proceeds to a process of step S12.

In the process of step S12, the charging control section 31 stores the vehicle information on the vehicle 2 (the information on the model, the license plate number, and the presence or the absence of the cooling mechanism 24 in the vehicle 2) in the vehicle information storage section 32. In this way, the process of step S12 is completed, and the charging control process is terminated.

As it is apparent from the description that has been made so far, in the charging control process according to the embodiment of the disclosure, before initiating charging of the battery 21, the charging control section 31 determines whether the cooling mechanism 24 for the charging inlet 22a is provided in the vehicle 2. Then, in the case where the cooling mechanism 24 for the charging inlet 22a is provided, the charge current for the battery 21 is set to be larger than that in the case where the cooling mechanism 24 for the charging inlet 22a is not provided. According to such a configuration, the charge current for the battery 21, which is mounted in the vehicle 2, is controlled in accordance with whether the cooling mechanism 24 for the charging inlet 22a is provided in the vehicle 2. Thus, the battery 21, which is mounted in the vehicle 2, can be charged efficiently.

In addition, in the charging control process according to the embodiment of the disclosure, the charging control section 31 determines whether the temperature increase amount dT/dt per unit time of the charging inlet 22a (i.e., an increase amount dT/dt per unit time of a temperature of the charging inlet 22a) is smaller than the specified value A during the execution of the charging process. In the case where the temperature increase amount dT/dt per unit time of the charging inlet 22a is smaller than the specified value A, the charge current for the battery 21 is set to the upper limit current Imax. In the case where the temperature increase amount dT/dt per unit time of the charging inlet 22a is equal to or larger than the specified value A, the charge current for the battery 21 is restricted to the specified value that is smaller than the upper limit current Imax. Thus, the battery 21 can be charged efficiently in consideration of an operating state of the cooling mechanism 24 for the charging inlet 22a.

Figure 6:
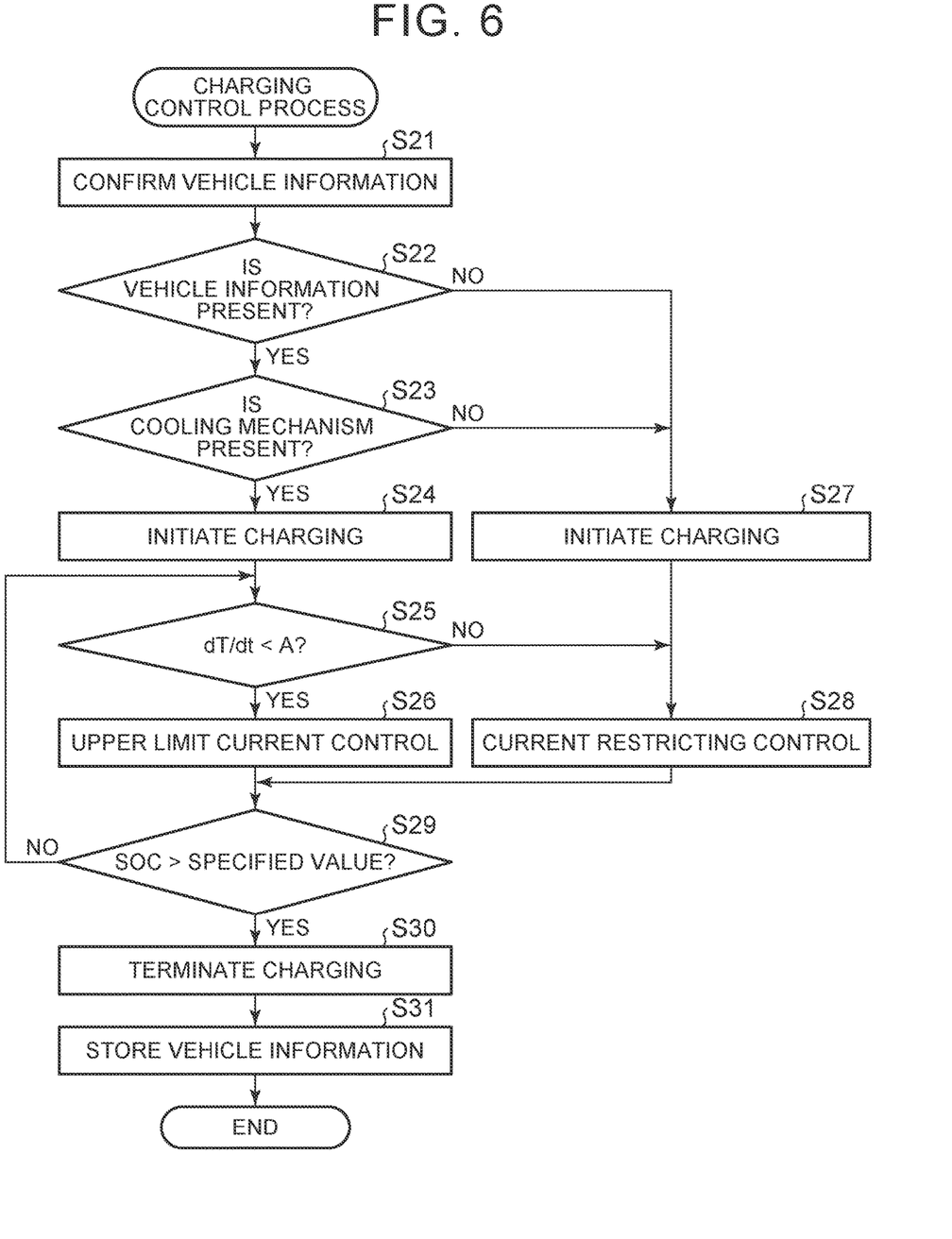
FIG. 6 is a flowchart illustrating a procedure of the charging control process according to a modified example of the embodiment of the disclosure.

A description will lastly be made on a modified example of the charging control process according to the embodiment of the disclosure with reference to FIG. 6.

FIG. 6 is a flowchart illustrating a procedure of the modified example of the charging control process according to the embodiment of the disclosure. The flowchart illustrated in FIG. 6 is initiated at the timing at which the charging connector 31a is connected to the charging inlet 22a, and the charging control process proceeds to a process in step S21. Note that the charging control section 31 may initiate the charging control process at the timing at which the position information system such as the GPS detects that the vehicle 2 enters the specified range around the installed position of the charger 3 or the timing at which the user shows the intention of using the charger 3 by making the reservation for use of the charger 3, or the like.

In the process of step S21, the charging control section 31 confirms the presence or the absence of the vehicle information on the vehicle 2, to which the charging connector 31a is connected. Note that, because this process has the same content as the process of step S1 described above, a detailed description thereon will not be made. In this way, the process of step S21 is completed, and the charging control process proceeds to a process of step S22.

In the process of step S22, the charging control section 31 determines whether the vehicle information is confirmed in the process of step S21. As a result of the determination, if the vehicle information is confirmed (step S22: YES), the charging control process proceeds to a process of step S23. On the other hand, if the vehicle information is not confirmed (step S22: NO), the charging control process proceeds to a process of step S27.

In the process of step S23, the charging control section 31 determines whether the vehicle 2 includes the cooling mechanism 24 on the basis of the vehicle information. As a result of the determination, if the vehicle 2 includes the cooling mechanism 24 (step S23: YES), the charging control process proceeds to a process of step S24. On the other hand, if the vehicle 2 does not include the cooling mechanism 24 or the presence or the absence of the cooling mechanism 24 cannot be determined on the basis of the vehicle information (step S23: NO), the charging control process proceeds to a process of step S27.

In the process of step S24, the charging control section 31 initiates the charging process of the battery 21 in cooperation with the charging control section 22. In this way, the process of step S24 is completed, and the charging control process proceeds to a process of step S25.

In the process of step S25, based on the electric signal from the temperature detecting section 23, the charging control section 31 determines whether the increase amount dT/dt per unit time of the temperature T of the charging inlet 22a is smaller than the specified value A. As a result of the determination, if the increase amount dT/dt per unit time of the temperature T of the charging inlet 22a is smaller than the specified value A (step S25: YES), the charging control process proceeds to a process of step S26. On the other hand, if the increase amount dT/dt per unit time of the temperature T of the charging inlet 22a is equal to or larger than the specified value A (step S25: NO), the charging control process proceeds to a process of step S28.

In the process of step S26, the charging control section 31 determines that the cooling mechanism 24 is operated normally, and sets the charge current for the battery 21 to the upper limit current Imax (the upper limit current control). In this way, the process of step S26 is completed, and the charging control process proceeds to a process of step S29.

In the process of step S27, the charging control section 31 initiates the charging process of the battery 21 in cooperation with the charging control section 22. In this way, the process of step S27 is completed, and the charging control process proceeds to the process of step S28.

In the process of step S28, the charging control section 31 determines that the cooling mechanism 24 is not operated normally or that the cooling mechanism 24 is not provided in the vehicle 2, and controls the charge current for the battery 21 to the specified value $I_1$ that is smaller than the upper limit current Imax (the current restricting control). In this way, the process of step S28 is completed, and the charging control process proceeds to the process of step S29.

Because the processes of step S29 onward have the same contents as the processes of step S10 onward described above, a detailed description thereon will not be made.

The embodiment, to which the disclosure devised by the present inventor is applied, has been described so far. The disclosure is not limited to this embodiment. That is, all of the other embodiments, examples, operating techniques, and the like that are implemented by persons skilled in the art on the basis of this embodiment are included in the scope of the disclosure.

What is claimed is:

1. A charging apparatus configured to charge a battery mounted in a vehicle when a charging connector is connected to a charging inlet of the vehicle, the charging apparatus comprising:
an electronic control unit configured to determine whether a cooling mechanism for the charging inlet is provided in the vehicle, wherein in a case where the cooling mechanism for the charging inlet is provided, the electronic control unit sets a charge current for the battery to a value larger than a value to which the charge current for the battery is set in a case where the cooling mechanism for the charging inlet is not provided,
wherein the electronic control unit is further configured to set an upper limit for the charge current for the battery based on whether an increase amount per unit time of a temperature of the charging inlet is smaller than a preset value.

2. The charging apparatus according to claim 1, wherein the electronic control unit is configured to:
determine whether the increase amount per unit time of the temperature of the charging inlet is smaller than the preset value during execution of a charging process;
set the charge current for the battery to a first upper limit current in a case where the increase amount per unit time of the temperature of the charging inlet is smaller than the preset value; and
restrict the charge current for the battery to a second upper limit current that is smaller than the first upper limit current in a case where the increase amount per unit time of the temperature of the charging inlet is equal to or larger than the preset value.

3. The charging apparatus according to claim 1, wherein the electronic control unit is configured to set the charge current for the battery based on whether the cooling mechanism for the charging inlet is provided, before charging of the battery is initiated.

4. The charging apparatus according to claim 2, wherein the electronic control unit is configured to set the charge current for the battery based on the increase amount per unit time of the temperature of the charging inlet, after charging of the battery is initiated.

* * * * *